Jan. 18, 1966 V. C. MARTIN 3,230,432

DRIVE CIRCUIT UTILIZING SOLID STATE DEVICES

Filed Dec. 21, 1962 2 Sheets-Sheet 1

INVENTOR

VAN C. MARTIN

BY Leo J. Aubel

ATTORNEY

Jan. 18, 1966 V. C. MARTIN 3,230,432

DRIVE CIRCUIT UTILIZING SOLID STATE DEVICES

Filed Dec. 21, 1962 2 Sheets-Sheet 2

3,230,432
Patented Jan. 18, 1966

3,230,432
DRIVE CIRCUIT UTILIZING SOLID STATE DEVICES

Van C. Martin, Endicott, N.Y., assignor to International Business Machines Corporation, New York, N.Y., a corporation of New York Filed Dec. 21, 1962, Ser. No. 246,376
8 Claims. (Cl. 317—262)

This invention relates to high voltage drive circuits and more particularly to circuits utilizing solid state devices for providing high amplitude voltage drive of both positive and negative polarities.

In present technology, there is need for circuits utilizing solid state devices for generating high voltage pulses of both positive and negative polarities and particularly for such circuits which would provide high voltage drive in both positive and negative polarities for purposes of controlling electrostatic clutches. As is known, the operation of electrostatic clutches depends upon the electrostatic forces between a conductive member and a cooperating simultaneous member. The electroadhesive effect between conductors and semi-conductors is well known in the art, and there are a number of materials that will exhibit electroadhesion. The primary advantages of electrostatic clutches over other similar devices are rapid electromechanical response time in the order of microseconds. Electrostatic clutches also have the advantages of low control current in the order of milliamperes at 150 volts and of small size in relation to the amount of torque output. Electrostatic clutches are conveniently operated in the range of 150 to 300 volts, and conventional transistor circuits normally do not operate at such high voltage levels.

It has been found that in some cases if, say, a positive voltage signal is applied to control an electrostatic clutch, the clutch tends to retain some of the positive charge, causing residual torque when the clutch is de-energized and reducing torque output when the clutch is subsequently energized. Thus, if a positive voltage is applied to an electrostatic clutch, it is desirable to remove the residual charge as by applying a negative pulse of short duration to the pulse of short duration to the clutch in order to reduce residual drag and produce more consistent drive torque.

Accordingly, it is a principal object of the present invention to provide a circuit utilizing solid state devices and developing high amplitude voltage drive.

It is another object of the present invention to provide a circuit utilizing solid state devices and developing a high voltage drive of both positive and negative polarities.

It is another object of the present invention to provide a circuit utilizing solid state devices and arranged to control an electrostatic clutch.

In one embodiment of the invention I provide a high voltage drive circuit utilizing silicon controlled rectifiers which are capable of being turned OFF by the application of suitable voltage to their gate electrodes such as, for example, the General Electric type ZJ224 silicon controlled rectifier. Silicon controlled rectifiers are well known in the art and are generally described in, for example, the Silicon Controlled Rectifier Manual, second edition, prepared by the General Electric Company, Rectifier Components Dept., Auburn, New York. Silicon controlled rectifiers with gate turn OFF capabilities can operate at voltages in the range of 150 to 600 volts and provide a latching or memory function; that is, once a silicon controlled rectifier is turned ON it will tend to latch or stay ON until sufficient reverse current is drawn from the gate to some more negative potential to turn it OFF. Also, silicon controlled rectifiers provide efficient switching operations since the type of rectifiers switch completely ON and OFF at a relatively fast rate, that is, in the microsecond region. In this description the term rectifier "turn ON" or "turned ON," etc., refers to the rectifier being energized to be conductive and conversely "turn OFF" refers to the rectifier being non-conductive.

In the embodiment shown, silicon controlled rectifiers are utilized to control the signal provided to an electrostatic clutch. In operation, an input signal is amplified and inverted by a first silicon controlled rectifier and the output of said first silicon controlled rectifier gates a second silicon controlled rectifier (operating in a cathode follower configuration) to be turned ON or turned OFF. One terminal of a parallel resistor-capacitor network is connected to the cathode of the second silicon controlled rectifier and the second terminal of the network is connected to an electrostatic clutch and in parallel through an impedance to ground reference. The second silicon controlled rectifier when gated or turned ON provides a 300 volt signal which is instantaneously applied to the electrostatic clutch. Thence, the capacitor charges exponentially to approximately 150 volts and the steady state signal applied to the electrostatic clutches reduces to a steady state value of 150 volts.

When the input signal terminates, the output of the first silicon controlled rectifier drives the second silicon controlled rectifier OFF; instantaneously, the signal applied to the electrostatic clutch changes by the full potential applied to the gate of the second silicon controlled rectifier to thus provide an instantaneous high negative voltage to the clutch to remove the residual charge. The capacitor then discharges exponentially and the voltage applied to the clutch decreases to zero volts.

The foregoing and other objects, features and advantages of the invention will be apparent from the following more particular description of preferred embodiments of the invention, as illustrated in the accompanying drawings.

Figure 1:
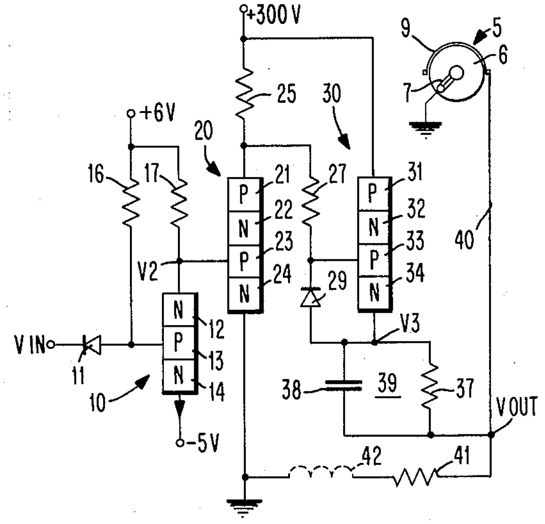
FIG. 1 shows a schematic diagram of a circuit in accordance with the invention.
Figure 2:
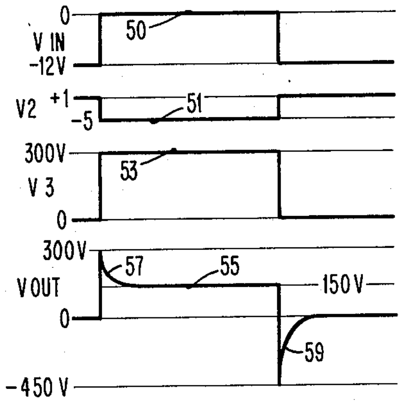
FIG. 2 shows waveforms useful in explaining the operation of the circuit of FIG. 1.

A basic embodiment of the driving circuit of the invention is shown in FIG. 1. In FIG. 1, a pair of identical silicon controlled rectifiers 20 and 30, which are capable of being turned OFF by the application of a suitable voltage to their respective gates 23 and 33, are connected in a circuit to provide a driving signal as indicated in waveform VOUT in FIG. 2, as will be explained in more detail hereinbelow.

The silicon controlled rectifier 20 includes a cathode 24, the gate 23, a second N-doped layer 22 and an anode 21; silicon controlled rectifier 30 includes a cathode 34, the gate 33, a second N-doped layer 32 and an anode 31. An input transistor 10 includes an emitter 14, a base 13 and a collector 12.

Hereinafter in this description, the terms rectifier and silicon controlled rectifier will be used interchangeably.

The input signal VIN from any suitable control source, not shown, is coupled through a diode 11 to the base 13 of transistor 10. The base 13 of transistor 10 is also connected through a resistor 16 to a source of +6 volts operating potential, not shown, to obtain a conducting turn ON bias. The sources of potentials indicated in the various drawings are of any known types suitable for providing the potentials indicated. The emitter 14 of transistor 10 is connected to a source of potential, not shown, of —5 volts. The collector 12 of transistor 10 is connected to the gate 23 of silicon controlled rectifier 20. The collector 12 is also connected through a resistor 17 to a source of +6 volts operating potential, not shown.

The cathode 24 of the rectifier 20 is connected to ground reference and its anode 21 is connected through a resistor 25 to a source of +300 volts potential, not shown. The anode 21 of rectifier 20 is connected through a resistor 27 having a low impedance to the gate 33 of rectifier 30. The resistor 27 is included in the circuit merely for current limiting or protective purposes in the manner of a conventional fuse, and its presence does not materially effect the operation of the circuit of the invention. The anode 31 of rectifier 30 is also connected to a source of +300 volts potential, not shown.

A diode 29 has its anode, not numbered, connected to the cathode 34 of rectifier 30 and its cathode, not numbered, connected to the gate 33 of rectifier 30 for purposes to be described hereinbelow.

A parallel circuit or network 39 comprising a resistor 37 and a capacitor 38 has one terminal connected to the cathode 34 of rectifier 30, and its other or second terminal is connected through lead 40 to a band 9 of an electrostatic clutch 5. The rectifier 30 is thus arranged in a cathode follower type configuration. In one embodiment, capacitor 38 is of about 1000 micromicrofarads in size and resistor 37 is a 20K ohms resistor. The rotor 6 of clutch 5 is connected through a brush 7 to ground reference. The second terminal of parallel network 39 is also connected through resistor 41 and an inductor 42 to ground reference. The inductor 42, shown dotted in FIG. 1, may be included in the circuit for purposes to be described hereinbelow.

The operation of the circuit of FIG. 1 is as follows. The input signal indicated by the label VIN in FIG. 1 and the waveform V2 in FIG. 2, appearing at the input as indicated in FIG. 1, rises from an initial value of —12 volts to a steady state zero or ground potential indicated by the portion 50 of waveform VIN. This signal VIN in effect, removes the reverse bias from base 13 of transistor 10 and permits transistor 10 to conduct; the potential on the collector 12 of transistor 10 drops to approximately —5 volts, as indicated by portion 51 of waveform V2 in FIG. 2 and the label V2 on FIG. 1. This drop in potential on the collector 12 causes rectifier 20 to stop conducting, i.e., to turn OFF; in turn, the anode 21 of rectifier 20 rises to approximately +300 volts. This increase in potential at the anode 21 is coupled through resistor 27 to the gate 33 of rectifier 30, forcing rectifier 30 to conduct, i.e., to turn ON and causes the voltage on the cathode 34 of rectifier 30 to rise to approximately +300 volts as indicated by the waveform V3 in FIG. 2 and the label V3 in FIG. 1. Because of capacitor action, that is, because the potential of the capacitor 38 does not change instantaneously, the entire +300 volts appearing at the cathode 34 of rectifier 30 is coupled through capacitor 38 and lead 40 to the band 9 of the electrostatic clutch 5, as shown by the portion 57 of the waveform VOUT of FIG. 2. This initial 300 volts applied to the clutch is desirable to actuate the clutch rapidly. Capacitor 38 then charges exponentially to approximately 150 volts through the circuit including resistor 41, resistor 37 and inductor 42; thus, the steady state driving voltage applied to the band 9 of electrostatic clutch 5 is approximately 150 volts, as indicated by the portion 55 of waveform VOUT of FIG. 2. This lower voltage of 150 volts provides the proper drive to the clutch 5.

At turn OFF time, the input signal VIN drops to its initial level of —12 volts which causes transistor 10 to cut OFF and forces rectifier 20 into conduction. The potential on the anode 21 of rectifier 20 falls to approximately ground reference as indicated by waveform V3, reverse biasing the gate-cathode junction of rectifier 30 and turning rectifier 30 OFF. At this point, diode 29 becomes forward biased and conducts, driving cathode 34 of rectifier 30 to the potential of anode 21, i.e., to ground potential. The diode 29 should have a forward drop of approximately 4 volts in order to obtain sufficient reverse bias on the gate 33 and cathode 34 of rectifier 30 to permit turn OFF of the rectifier 30. The diode 29 may comprise several diodes in series to obtain this forward drop. The total instantaneous charge of potential at the cathode 34 of rectifier 30 is 300 volts in a negative-going direction. Note that the capacitor 38 had a —150 volts steady state voltage impressed thereacross. Thus, due to this 300 volts potential change in the negative direction, the instantaneous voltage applied to the clutch 5 falls to a —450 volts (—150 v. plus —300 v.=—450 v.) as indicated by portin 59 of waveform VOUT. The capacitor 38 will then discharge exponentially to zero potential through diode 29, rectifier 20, resistor 37, inductor 42 and resistor 41. This negative spike during the turn OFF operation is desirable in order to remove the residual charge from the clutch 5, as discussed above, to reduce or eliminate residual drag and make the response of the clutch 5 more consistent.

The inductor 42, shown dotted in FIG. 1, may be included in the circuit in order to initially channel the charging current to thec lutch rather than through resistor 41 to ground. The inductor 42 in essence permits a smaller capacitor 38 to be used in the circuit and is not required if a relatively larger capacitor 38 is used.

Figure 3:
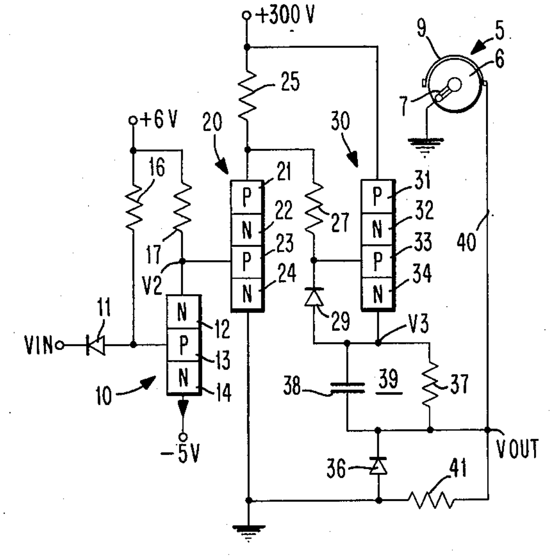
FIG. 3 shows a modification of the circuit of FIG. 1.
Figure 4:
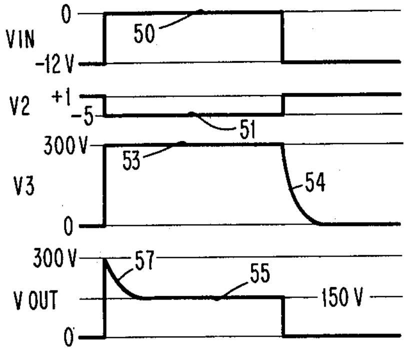
FIG. 4 shows some waveforms useful in explaining the operation of FIG. 3.

The circuit of FIG. 3 operates in the same manner as the circuit of FIG. 1 with the exception that the diode 36 having its anode, not numbered, connected to ground reference and its cathode connected to the lower terminal of the parallel network 39 eliminates the negative spike on the output signal voltage, VOUT as shown in FIG. 4, during the turn OFF operation by clamping the output signal voltage at ground reference. As is known, in the circuit of FIG. 3, if the voltage at the lower terminal in the parallel network 39 tends to go in a negative direction, the diode 36 will conduct and clamp this negative-going voltage to zero or ground reference. The circuit of FIG. 3 may be preferred if other means of removing the residual charge on the clutch are available or desirable. In FIG. 3, the voltage VOUT is clamped at ground potential and the voltage V3 discharges exponentially from 300 v. to zero volts, as shown by portion 54 of waveform V3 in FIG. 4.

Figure 5:
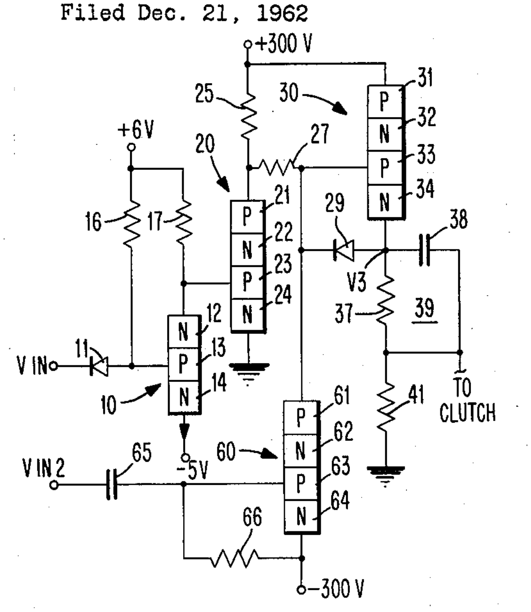
FIG. 5 shows another modification of the circuit of FIG. 1.

The circuit of FIG. 5 is similar to the circuit of FIG. 1 with the exception that an additional rectifier 60 is included in the circuit for providing a relatively wide negative pulse during the turn OFF operation. Rectifier 60 is identical to rectifiers 20 and 30 and includes a cathode 64, a gate 63, a second N-doped layer 62, and an anode 61. The cathode 64 of rectifier 60 is connected to a source of —300 volts potential, not shown. The anode 61 of rectifier 60 is connected to the junction of resistor 27 and to the gate 33 of rectifier 30. As discussed above, resistor 27 may be deleted without materially affecting circuit operation. A second input signal VIN2 is coupled to the gate 63 of rectifier 60 through a capacitor 65. A resistor 66 is connected from the gate 63 to the cathode 64 of the rectifier 60 to decrease gate sensitivity. The rectifier 60 is provided in the circuit in order to permit an operation in which a negative output voltage VOUT may be obtained at the output at a selected time. This will permit the circuit to function as a positive and negative waveform generator with any desired sequence of positive and negative pulses.

Figure 6:
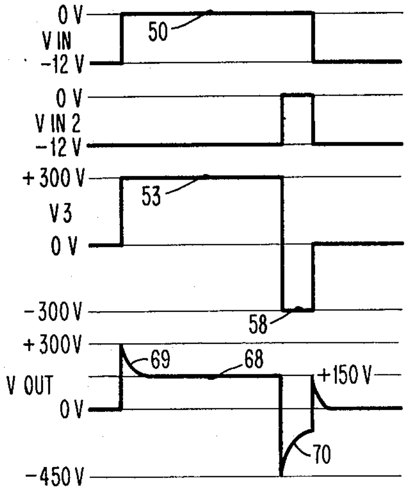
FIG. 6 shows some waveforms useful in explaining the operation of FIG. 5.

The turn ON operation of the circuit of FIG. 5 is the same as that of FIG. 1, while the turn OFF operation of the circuit of FIG. 5 is somewhat different from that of FIG. 1 and is as follows. To obtain a negative pulse output, a signal VIN2, indicated by the waveform in FIG. 6 and labeled in FIG. 5, is applied to the gate 63 of rectifier 60. This causes rectifier 60 to turn ON and in turn causes a −300 volts potential to be applied to the anode 61 of rectifier 60 and to the gate 33 of rectifier 30 turning OFF rectifier 30; and also to the cathode 34 of rectifier 30 through diode 29, as indicated by portion 58 of waveform V3. Note that the turn ON signal VIN initially impressed a voltage across capacitor 38 of 150 volts had a positive polarity at its terminal connecting to the cathode 34 of rectifier 30 and a negative polarity at its terminal connecting to the clutch 5. The −300 volts applied to the parallel network 39 during the turn OFF operation to the cathode 34 will have a positive polarity at its terminal connecting to the cathode 34 and negative polarity at its terminal connecting to clutch 5. Thus, the −300 volts will add to the voltage impressed across the capacitor 38 and instantaneously a −450 volts potential will be applied to the clutch 5 as shown by waveform VOUT in FIG. 6. The capacitor 38 will then discharge exponentially, as indicated by portion 70 of waveform VOUT, through the circuit loop including diode 29, rectifier 20 and resistors 41 and 37 to approximately −150 volts and will remain at that potential until the termination of input signal VIN2. When the signal pulse VIN2 terminates, coincidentally with the termination of the signal VIN, rectifier 60 is turned OFF; the voltage at the cathode 34 of rectifier 30 changes by 300 volts. The voltage applied to clutch 5 will be an instantaneous 150 volt positive peak voltage which will discharge through diode 29, rectifier 20 (which is normally turned ON) and resistors 41 and 37.

Figure 7:
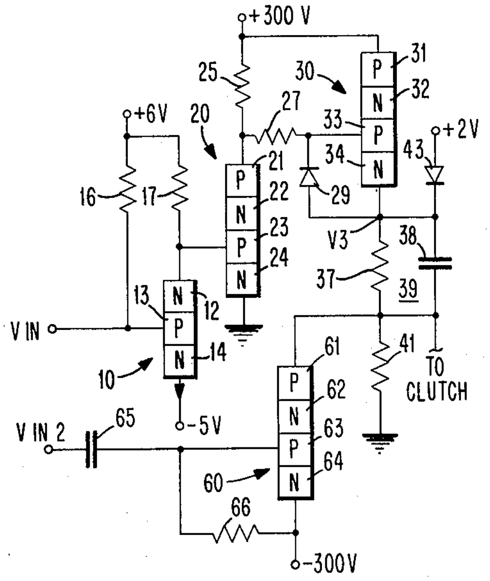
FIG. 7 shows yet another modification of the circuit of FIG. 1.
Figure 8:
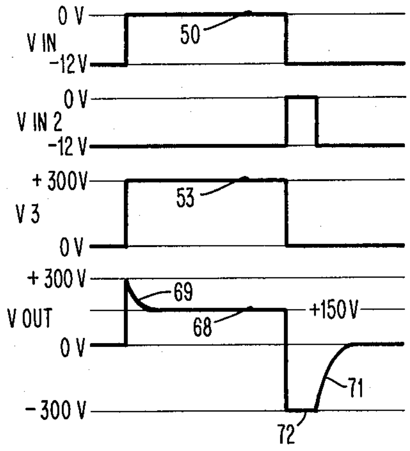
FIG. 8 shows some waveforms useful in explaining the operation of FIG. 7.

The circuit of FIG. 7 is the same as that of FIG. 5 with the exception that the anode 61 of rectifier 60 is connected directly to the lower terminal, as oriented in the drawings, of parallel network 39 and thus directly to the clutch 5. Also, a diode 43 is connected to the upper terminal, as oriented in FIG. 7, of network 39. Diode 43 prevents the cathode 34 of rectifier 30 from going more negative than its gate 33; this prevents rectifier 30 from conducting during the period when the circuit is providing a negative pulse indicated by portion 72 of waveform VOUT in FIG. 8, to this limit the dissipation of power in rectifier 30 during this period.

The operation of FIG. 7 is similar to that of FIG. 5 with the exception that the leading edge of the turn OFF signal VIN2 is applied to the circuit to coincide with the trailing edge or termination of the turn ON signal VIN. The negative pulse V3 is applied directly from rectifier 60 to the clutch 5 rather than through the gate 33 and cathode 34 of rectifier 30. The circuit of FIG. 7 provides a −300 volts pulse output until the fall of VIN2 as indicated by the portion 72 waveform VOUT. When the input voltage VIN2 terminates, the rectifier 60 will turn OFF and VOUT will exponentially decay to ground potential from −300 volts through resistors 37 and 41, diode 29, resistor 27 and rectifier 20. The cathode of rectifier 30 is clamped from rising above zero volt by conducting rectifier 20 and diode 29.

Note that in the circuits of FIGURES 1, 3 and 5, the capacitor 38 may be deleted from the circuit and the output voltage can be taken directly from the cathode 34 of rectifier 30 to obtain a square drive voltage of a positive polarity and with no decay; this may be desirable when utilizing the circuits as pulse generators.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for providing drive pulses comprising, in combination:

(a) a plurality of silicon controlled rectifiers each having two stable conductive states and each including a cathode, a gate and an anode;
(b) the last or output rectifier being connected in a cathode follower configuration;
(c) means for providing an input signal to control the conductive states of said rectifiers to provide a positive-going voltage pulse from said output rectifier;
(d) means for changing the conductive state of said output rectifier to cause the voltage coupled from said rectifier to drop to thereby provide a negative-going pulse.

2. A circuit for controlling an electrostatic clutch comprising, in combination:

(a) a plurality of silicon controlled rectifiers each having two stable conductive states and each including a cathode, a gate and an anode;
(b) the last or output rectifier being connected in a cathode follower configuration;
(c) a capacitor having one terminal connected to the output rectifier and its other terminal connected to said electrostatic clutch;
(d) means for providing a control signal to change the conductive states of said rectifiers to provide a positive voltage spike from said output rectifier through said capacitor to said electrostatic clutch;
(e) said capacitor then exponentially charging to a steady potential whereby a relatively lower driving voltage signal is applied to said electrostatic clutch;
(f) the conductive state of said output rectifier being changed when the said control signal is terminated causing the voltage coupled to said clutch to drop instantaneously from said steady potential on said capacitor to thereby provide a negative voltage spike to said clutch; and,
(g) said capacitor then exponentially discharging to ground potential.

3. A circuit for controlling an electrostatic clutch comprising, in combination:

(a) first and second silicon controlled rectifiers each having two stable conductive states and each including a cathode, a gate and an anode;
(b) means for coupling said rectifiers in series;
(c) a capacitor having one terminal connected to the cathode of said second rectifier and its other terminal connected to said electrostatic clutch;
(d) means for providing a control signal to change the conductive states of said rectifiers to provide a positive voltage spike from said second rectifier through said capacitor to said electrostatic clutch;
(e) said capacitor then exponentially charging to a steady potential whereby a relatively lower driving voltage signal is applied to said electrostatic clutch;
(f) the conductive state of said second rectifier being changed when said control signal is terminated causing the voltage coupled to said clutch to drop instantaneously from said steady potential on said capacitor to thereby provide a negative voltage spike to said clutch; and, (g) said capacitor then exponentially discharging to ground potential.

4. A circuit for controlling an electrostatic clutch comprising, in combination:

(a) first and second gate turn OFF type of silicon controlled rectifiers each including a cathode, a gate and an anode;
(b) means for connecting the output voltage of said first rectifier as the input voltage to said second rectifier;
(c) means for respectively connecting said rectifiers to suitable operating potentials;
(d) a resistor and capacitor connected in a parallel circuit, one terminal of said parallel circuit being connected to the cathode of said second rectifier and the other terminal of said parallel circuit being connected to said electrostatic clutch;
(e) said first rectifier being normally turned ON and said second rectifier being normally turned OFF;
(f) means for connecting a control signal to turn OFF said first rectifier and develop a high voltage at its anode;
(g) said second rectifier being turned ON when said first rectifier is turned OFF and causing the potential at the cathode of said second rectifier to rise instantaneously to the potential of said anode of said first rectifier to provide a positive voltage spike through said capacitor to said electrostatic clutch;
(h) said capacitor then exponentially charging to a steady state voltage whereby the voltage provided to said clutch decreases exponentially to a steady state value;
(i) said second rectifier being turned OFF when said first rectifier is turned ON by the termination of said control signal and causing the potential at the cathode of said second rectifier to drop instantaneously from said steady state value to provide a negative voltage spike to said electrostatic clutch; and,
(j) said capacitor then exponentially discharging to ground potential.

5. A circuit as in claim 4 including:

(k) a diode having its cathode connected to the gate of said second rectifier and its anode connected to the cathode of said second rectifier, said diode having a forward drop thereacross sufficient to reverse bias and turn OFF said second rectifier when said diode is forward biased by conduction of said first rectifier and a positive potential appearing at the cathode of said second rectifier.

6. A circuit as in claims 4 and 5 including:

(l) a diode connected to the terminal of said parallel circuit connected to said electrostatic clutch for clamping said terminal to ground reference and preventing a negative voltage spike from being coupled to said electrostatic clutch.

7. A circuit for controlling an electrostatic clutch comprising, in combination:

(a) first, second and third silicon controlled rectifiers each including a cathode, a gate and an anode;
(b) means for connecting the voltage signal from the anodes of said first and third rectifiers as the input voltage to the gate of said second rectifier;
(c) means for respectively connecting the anodes of said first and second rectifiers to suitable operating potentials of positive polarity, and the cathode of said third rectifier to a suitable operating potential of negative polarity;
(d) a resistor and capacitor connected in a parallel circuit, one terminal of said parallel circuit being connected to the cathode of said second rectifier and the other terminal of said parallel circuit being connected to said electrostatic clutch;
(e) said first rectifier being normally turned ON and said second and third rectifiers being normally turned OFF;

(f) means for connecting a first control signal to the gate of said first rectifier to turn OFF said first rectifier;
(g) said second rectifier being turned ON when said first rectifier is turned OFF and causing the potential at the cathode of said second rectifier to rise instantaneously to the potential of the anode of said first rectifier to thereby couple a positive voltage spike through said capacitor to said electrostatic clutch;
(h) said capacitor then exponentially charging to a steady state voltage whereby the voltage provided to said clutch decreases exponentially to a steady state;
(i) a diode having its cathode connected to the gate of said second rectifier and its anode to the cathode of said second rectifier;
(j) means for connecting a second control signal to the gate of said third rectifier to turn ON said third rectifier and cause the potential at its anode to fall to a negative polarity;
(k) the potential on the anode of said third rectifier being coupled to said cathode of said second rectifier through said diode and causing the potential at the cathode of said second rectifier to fall instantaneously from said steady state voltage being applied to said clutch to thereby provide a negative voltage spike through said capacitor to said electrostatic clutch;
(l) said diode reverse biasing said second rectifier when said negative voltage pulse is applied to assure turn OFF of said second rectifier; and,
(m) said capacitor then discharging exponentially toward ground potential.

8. A circuit for providing positive and negative drive pulses to a utilization circuit comprising, in combination:

(a) first, second and third silicon controlled rectifiers each including a cathode, a gate and an anode;
(b) means for connecting the voltage signal from the anode of said first rectifier as the input voltage to the gate of said second rectifier;
(c) means for connecting the voltage signal from the anode of said third rectifier to the utilization circuit;
(d) means for respectively connecting the anodes of said first and second rectifiers to suitable operating potentials of positive polarity, and the cathode of said third rectifier to a suitable operating potential of negative polarity;
(e) a resistor and capacitor connected in a parallel circuit, one terminal of said parallel circuit being connected to the cathode of said second rectifier and the other terminal of said parallel circuit being connected to said electrostatic clutch;
(f) said first rectifier being normally turned ON and said second and third rectifiers being normally turned OFF;
(g) means for connecting a first control signal pulse to the gate of said first rectifier to turn OFF said first rectifier;
(h) said second rectifier being turned ON when said first rectifier is turned OFF and causing the potential at the cathode of said second rectifier to rise instantaneously to the potential of the anode of said first rectifier to thereby couple a positive voltage spike through said capacitor to said electrostatic clutch;
(i) said capacitor then exponentially charging to a steady state voltage whereby the voltage provided to said utilization circuit decreases exponentially to a steady state value;
(j) means for connecting a second control signal pulse to the gate of said third rectifier to turn ON said third rectifier and cause the potential at its anode to fall to a negative polarity for a period of time determined by said second control signal pulse;
(k) the potential on the anode of said third rectifier being coupled to said utilization circuit to thereby provide a negative voltage pulse thereto;
(l) said capacitor then exponentially discharging toward ground potential when said second control signal terminates; and, (m) a diode having its cathode connected to the cathode of said second rectifier and its anode to a positive potential to clamp the cathode of said second rectifier at a positive potential and prevent said second rectifier from conducting during the period that said second control signal is applied.

References Cited by the Examiner

UNITED STATES PATENTS

| | | |
|---|---|---|
| 3,131,311 | 4/1964 | Ross. |
| 3,131,545 | 5/1964 | Gross et al. |
| 3,136,896 | 6/1964 | Cole et al. |

SAMUEL BERNSTEIN, *Primary Examiner.*